United States Patent [19]

Speiser

[11] Patent Number: 4,914,964
[45] Date of Patent: Apr. 10, 1990

[54] ALIGNMENT MEASURING SYSTEM AND METHOD
[75] Inventor: Benjamin T. Speiser, San Francisco, Calif.
[73] Assignee: Apquip Corporation, Carmel Valley, Calif.
[21] Appl. No.: 228,371
[22] Filed: Aug. 4, 1988
[51] Int. Cl.$^4$ ............................................. B65G 43/00
[52] U.S. Cl. .................................. 73/865.9; 198/502.1
[58] Field of Search ........................ 250/548, 561, 562; 377/16, 17; 73/865.9, 865.8; 198/502.1

[56] References Cited
U.S. PATENT DOCUMENTS
4,658,144 4/1987 Croyle .................................. 250/561
FOREIGN PATENT DOCUMENTS
0239390 9/1986 Fed. Rep. of Germany ... 198/502.1

Primary Examiner—Robert R. Raevis
Attorney, Agent, or Firm—Flehr, Hohbach, Test, Albritton & Herbert

[57] ABSTRACT

An apparatus for measuring the alignment of two or more adjacent targets while the targets are in motion is provided. The alignment measuring apparatus includes a plurality of alignment scanners, each adapted to detecting the arrival of an associated target. A speed scanner is spaced apart from the alignment scanner for detecting said first one of the targets. First timing means are provided for measuring a first time differential indicative of the time delay between detection of the leading and trailing targets by the alignment scanners to provide a measurement proportional to the misalignment between the targets. Second timing means measure a second time differential indicative of the time delay between detection of the first target by the speed scanner and its associated alignment scanner to provide a measurement that is proportional to the speed at which the lugs are traveling and determining whether adjacent lugs are within a selected alignment tolerance based in part upon the time differential measurements. An oscillatory timing clock operates at a selected frequency and the first timing means determines the number of clock pulses that occur during said first time differential measurement. Similarly, the second timing means determines the number of clock pulses that occur during the second time differential measurement. A frequency divider proportionally dividing the number of clock pulses in said second time differential measurement by a selectable number to provide an calibration output indicative of the maximum number of clock pulses that may occur within the first time differential measurement for the targets to be within a selected tolerance. The magnitude of the calibration output is then compared to the number of pulses within said first time differential measurement to determine whether the targets are within the selected tolerance.

15 Claims, 4 Drawing Sheets

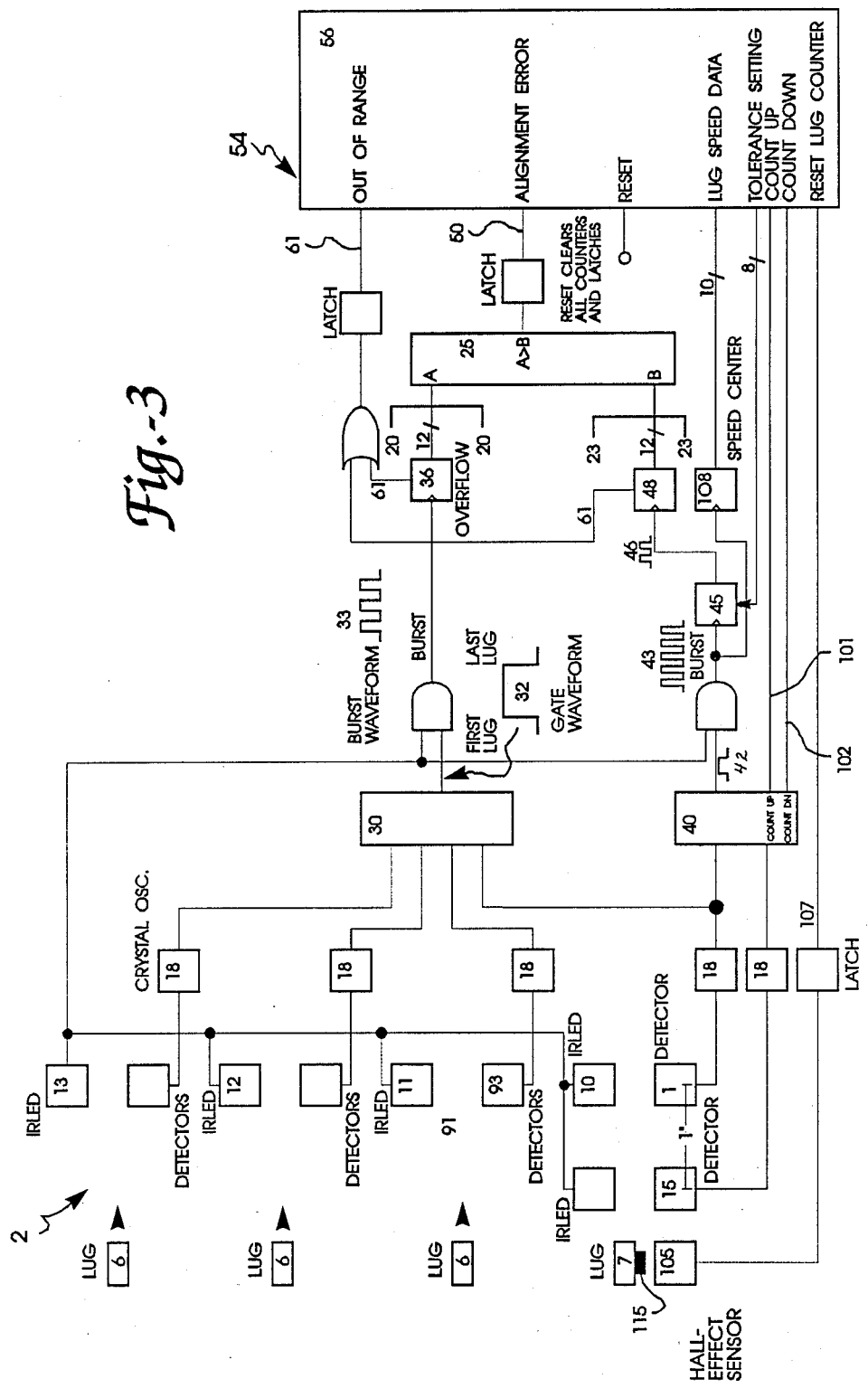

ALIGNMENT MEASURING SYSTEM AND METHOD

This application is related to co-pending application Ser. No. 228,548 filed Aug. 4, 1988, which is incorporated herein by reference.

The present invention relates generally to an improved system and method for precisely measuring the alignment of moving targets. More particularly, the invention relates to improved timing circuitry to facilitate making the highly accurate measurements necessary for alignment measurements on the fly.

BACKGROUND OF THE INVENTION

In many automated production environments moving conveyors are used to transport components and/or production parts. Many applications require that the load carried by the conveyor be affirmatively held in place on the conveyor in order to facilitate one or more particular steps in the production or fabrication process. Often, it is also necessary to precisely position the load on the conveyor to facilitate a precision cutting, measuring or assembly step. To facilitate such positioning, conveyors are traditionally outfitted with one or more outwardly extending lugs which are adapted to engage particular loads carried by the conveyor. One common approach is to use a pair of spaced apart parallel lugs that have precisely aligned front surfaces.

A good example of an assembly that incorporates a conveyor system of the type described above is a finger-joint cutting machine used within the lumber industry to make the precision cuts necessary to form finger joints. Specifically, the conveyor includes two or more parallel chains that form an endless loop and a multiplicity of load stations are disposed about the endless loop at relatively equidistant intervals. The conveyor may be operated at a wide variety of speed and by way of example, speeds in the vicinity of 100 feet per minute are common. Each load station includes two or more lugs which are precisely positioned adjacent each other to carry a single piece of wood stock. The lugs are steel or aluminum blocks mounted to the moving chains. By way of example, a representative conveyor may have on the order of 40-100 load stations with the lugs placed on six inch centers. Air bags are used to push down upon the finger-joint stock to firmly hold it in place as the conveyor carries the stock through various cutting and gluing stations.

If for any reason the cuts are not precisely made, the resultant finger-joints are defective due to openness in the joint area. Within conventional finger-joint production lines, the majority of the open joint defects that actually occur are directly attributable to misalignment of the lugs within one or more particular load stations. The precise tolerances required for the finger-joints dictate that if the lugs are out of alignment by as little as 2-5 mils, the cuts made by the finger-joint machine will produce unacceptable parts having open joints. These strict tolerances have created enormous difficulties within the industry because even if the lugs in only one load station are out of alignment, a large number of unacceptable products are produced and there is no easy way to identify the source of the defective parts. Therefore, the defective parts are often not discovered until well downstream of the cutting machines at which time the part is typically a complete loss or requires expensive rework to salvage. When defects begin occurring, the plant operators are faced with the decision of having to shut down the entire production line while the alignment of the lugs in each of the alignment stations are checked, (a process that may take 45 minutes) or to accept the high defect rate that will necessarily occur due to the lug misalignment. Neither option is an acceptable scenario.

To minimize the occurrence of lug misalignment, the alignment of each lug pair is typically checked by hand after every shift and aligned by hand with a square. Such a process is time consuming, expensive, and does not eliminate the development of misalignment during a production shift. It will be appreciated that the above described misalignment problem can cause difficulties in a wide variety of production and materials handling operations outside of the finger-joint industry, although the severity of the consequences of slight misalignments may vary a great deal from operation to operation. Other applications require even greater precision then that described above. For example, many metalworking applications require alignment resolution on the order of 1 mil or less. Therefore, there is a need for a device capable of accurately testing the alignment of devices such as conveyor lugs on the fly. One solution was proposed by Nowakowski in co-pending application Ser. No. 228,548, filed Aug. 4, 1988, the present invention is an improvement of that solution.

SUMMARY OF THE INVENTION

Accordingly, it is a primary objective of the present invention to provide an alignment measuring device capable of automatically determining the alignment of two or more moving targets while the lugs are in motion.

Another objective of the invention is to provide a mechanism for specifically identifying individual load stations on an endless conveyor that are out of alignment.

To achieve the foregoing and other objects and in accordance with the purpose of the present invention, an apparatus for measuring the alignment of two or more moving targets is provided. The alignment measuring apparatus includes a plurality of alignment scanners, each adapted to detecting the arrival of an associated target. A speed scanner is spaced apart from the alignment scanner for detecting said first one of the targets. First timing means are provided for measuring a first time differential indicative of the time delay between detection of the leading and trailing targets by the alignment scanners to provide a measurement proportional to the misalignment between the targets. Second timing means measure a second time differential indicative of the time delay between detection of the first target by the speed scanner and its associated alignment scanner to provide a measurement that is proportional to the speed at which the lugs are traveling and determining whether adjacent lugs are within a selected alignment tolerance based in part upon the time differential measurements. An oscillatory timing clock operates at a selected frequency and the first timing means determines the number of clock pulses that occur during said first time differential measurement. Similarly, the second timing means determines the number of clock pulses that occur during the second time differential measurement. A frequency divider proportionally divides the number of clock pulses in said second time differential measurement by a selectable number to provide an calibration output indicative of the maximum number of clock pulses that may occur within the first time differential measurement while still maintaining the targets within a selected tolerance. The magnitude of the calibration output is then compared to the number of pulses within said first time differential measurement to determine whether the targets are within the selected tolerance.

In a preferred embodiment, the frequency divider includes a plurality of serially arranged countdown registered at least one of which is programmable to allow selective variation of the magnitude that the frequency divider reduces the second time differential by.

In another preferred embodiment, the targets are lugs carried by an endless conveyor having a multiplicity of load stations each having at least a pair of lugs. Supervisory circuits keep track of the particular load stations that are misaligned and informs either an operator or a system controller of the misaligned load stations.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIG. 3 is a block diagram of the alignment measuring system of the present invention.

DETAILED DESCRIPTION OF THE DRAWINGS

Figure 1:
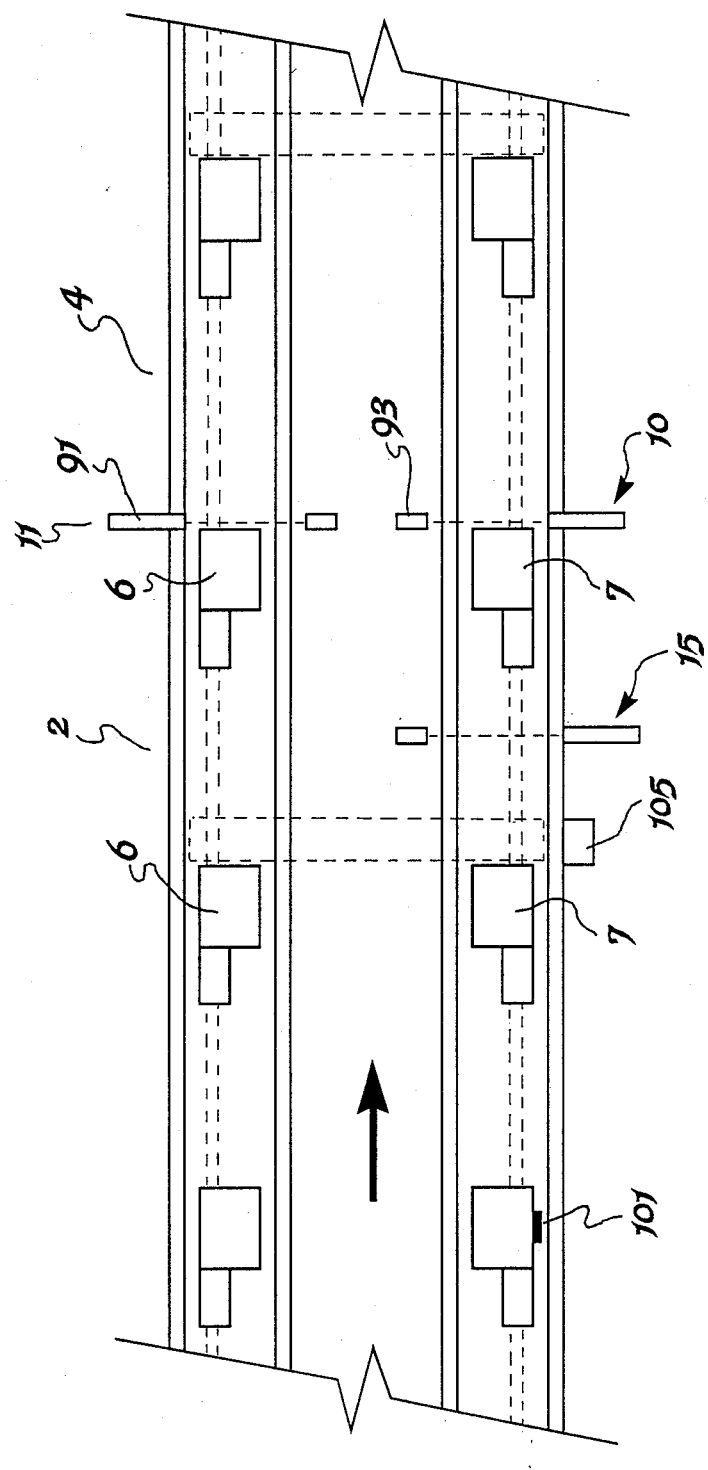
FIG. 1 is a diagrammatic to view of a conveyor system that incorporates a scanner system layout in accordance with the present invention.
Figure 2A:
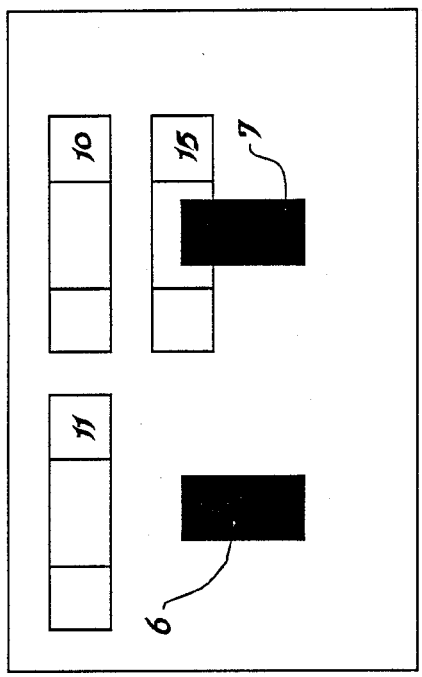
FIGS. 2a—2d show the progression of a load station through the scanners arrangement.
Figure 2C:
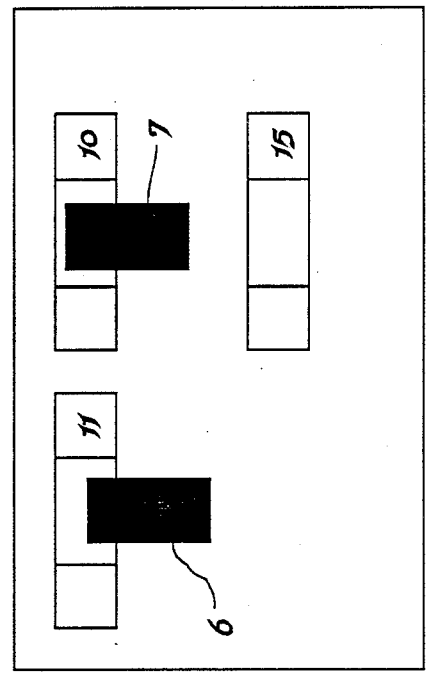
Figure 2B:
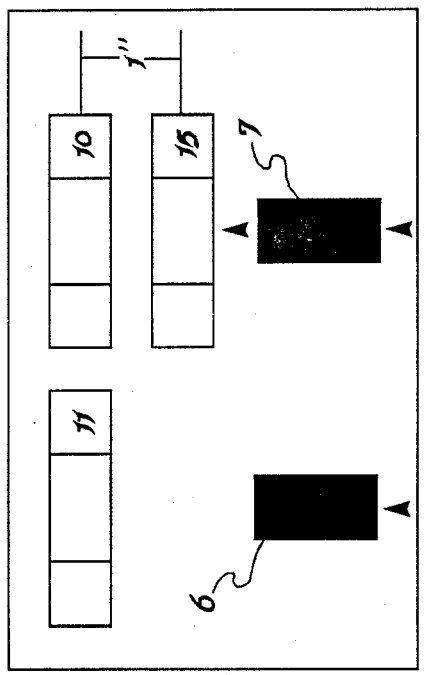
Figure 2D:
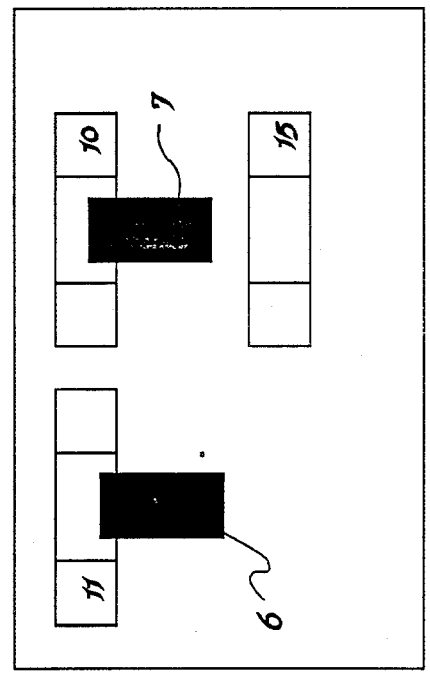

As illustrated in the drawings, the present invention relates to an alignment measuring device for measuring the alignment of two or more moving parts. In a finger joint application as described in the background section, the moving parts are the lugs which carry wood through various cutting and gluing operations. To accomplish this task, there are two fundamental approaches. The first is to make a virtually instantaneous, direct measurement of the distance separating the leading edges of the moving targets. The second approach is to measure the time interval between the arrival of the first target and the arrival of the last target. Appropriate scaling of this value to reflect the speed of the traveling targets, yields an indirect determination of the distance separating the targets.

Referring initially to FIG. 1 and 2, the embodiment of the invention chosen for the purposes of illustration measures misalignment of a multiplicity of load stations 2 that are carried by a rotatable endless conveyor 4. Each load station 2 includes two or more adjacent lugs 6 which are adapted to engage individual items carried by the conveyor 4. The alignment measuring device includes two or more alignment scanners 10-11, and a speed scanner 15 each positioned to detect the presence of a target lug immediately adjacent thereto. The alignment scanners 10-11 are precisely positioned to detect the leading edge of each passing lug and to produce an identifiable signal during the time period that they "see" a lug. The alignment scanners are also precisely positioned with respect to one another such that when the lugs are in perfect alignment, the alignment scanners 10-11 will simultaneously detect the leading edge of their associated passing lugs.

Speed scanner 15 is spaced apart from a first one of the alignment detectors 10 and is positioned to detect the passing of the same lug as alignment detector 10 (referred to herein as the reference lug 7). The speed scanner 15 is positioned a precise distance away from alignment detector 10 and the two scanners cooperate to provide a proportional measurement of the speed at which the lugs are traveling. As will be described in more detail below, each of the scanners 10-11 and 15 may take the form of high power narrow beamed infrared transmitters (LED's) with corresponding photodiode receivers. High power LED's are particularly useful in commercial applications so that the signals can be detected even in the presence of a great deal of dust and debris or in the presence of relatively large quantities of background lighting at various frequencies and intensities. The LED's are preferably pulsed at high frequencies. The pulsing allows the LED's to be operated at current levels that would exceed the devise's thermal limits if continuously operated which provides higher output light intensity levels than are possible with continuous light sources. Additionally, pulsed operation reduces the effects of background noise radiation. Each scanner has appropriate tone detector circuitry 18 for detecting the pulsed signal and transmitting an output signal when the infrared light beam is broken.

Referring next to FIG. 3, the alignment measuring system will be described in the environment of a system with four alignment scanners 10-13, although it should be appreciated that the system is equally applicable to any system having two or more alignment scanners. Conceptually, the alignment measuring system can be thought of as having an alignment measuring circuit 20 which determines the time delay between the arrival of the leading edge of the first and last lugs 6 at a particular point, and a calibration circuit 23 that determines the maximum allowable time delay that would still be within the stated tolerances. The outputs of measuring circuit 20 and calibration circuit 23 are compared by a magnitude comparator 25. If the misalignment measured by the measuring circuit 20 exceed the threshold tolerance determined by the calibration circuit, the load station being measured is misaligned. Otherwise, the load station 2 is within the allowable tolerances.

An clock oscillator 28 is used to time the various signals. Specifically, the various circuits routinely count the number of clock cycles that occur during a signal to determine its length. By way of example, a suitable clock oscillator is a quartz crystal based oscillator that operates at 100 KHz. As will be apparent from the discussion below, clock cycles are counted to measure the various time delays required. Therefore, the frequency of the clock must be high enough so that the period of the clock cycles are small relative to the period of the time delays measured.

Measuring circuit 20 includes an alignment timer circuit 30 that receives the outputs of the detection circuitry 18 for each of the alignment scanners 10-13 and generates a signal 32 having a period equivalent to the time delay between the detection of the first and last lugs associated with a particular load station. The time delay signal 32 undergoes a logical AND operation with the cyclical output of the oscillator 28 to provide a timing signal 33 which is a pulsed burst having the same envelope period as the time delay signal 32. The pulsed timing signal 33 is desirable to facilitate digital timing. The pulsed timing signal 33 is then passed into a misalignment counter 36 which counts the number of pulses in each particular burst it receives and outputs the result in BCD format to magnitude comparator 25.

The calibration circuit 23 measures the time differential between detection of reference lug 7 by speed scanner 15 and alignment scanner 10 and then scales the detected time differential to a value that is equivalent to the largest alignment time delay that is permissible for the selected tolerances of the system. The calibration circuit 23 includes a speed timer circuit 40 that receives the outputs of the detection circuitry of scanners 10,15 and generates a time delay signal 42 having a period equivalent to the time delay between detection of the leading edge of the reference lug by speed scanner 15 and alignment scanner 10. Like time delay signal 32, time delay signal 42 undergoes a logical AND operation with the cyclical output of the oscillator 28 to provide a pulsed speed timing signal 43 having the same envelope period as this associated time delay signal 42. Speed timing signal 43 is then passed through frequency divider 45 that divides the frequency of the incoming pulse by an externally programmable number to produce a scaled calibration signal 46 that is passed into calibration counter 48.

The frequency divider 45 has two inputs. It receives speed timing signal 43 and a programmed tolerance setting for the alignment of the lugs. The tolerance setting may be programmed via microswitches or through a computer interface port. The tolerance setting is chosen such that the scaled calibration signal 46 outputted from the frequency divider will contain the maximum number of pulses that a pulsed timing signal 33 may have while remaining within tolerances. By way of example, if speed scanner 15 is precisely positioned 1 inch away from alignment scanner 10, and the desired tolerances for the load stations is one mil, then the frequency divider 45 would divide the pulsed speed timing signal 43 by a factor of 1000. If the tolerance were two mils, then the frequency divider 45 would divide the pulsed speed timing signal 43 by a factor of 500. It should be apparent that the scaled calibration signal 46 will contain the maximum number of pulses that the timing signal 33 may have and still remain within the selected tolerances regardless of the speed at which the conveyor is traveling. However, the number of pulses within scaled calibration signal 46 will vary proportionally with the speed of the conveyor 4.

Calibration counter 48 counts the number of pulses in each particular calibration signal burst and outputs the total number of pulses counted to magnitude comparator 25 in BCD format. The magnitude comparator 25 then compared the numbers received from misalignment counter 36 and the calibration counter 48. If the magnitude of the output from calibration circuit 23 exceed the magnitude of the output of the measuring circuit 20, then the load station just measured is within tolerances and the system is reset to facilitate measuring the alignment of the next load station. If the magnitude of digitized output of the measurement circuit 20 is greater than the scaled output of the calibration circuit 23, then the load station is misaligned and a misalignment signal 50 is passed to supervisory circuits 54 which take the appropriate response. In the embodiment of the invention chosen for the purposes of illustration, the supervisory circuits 54 take the form of a microprocessor 56 programmed to perform the described functions. It should be apparent that the supervisory circuits 54 could readily be hardwired digital logic circuits as well.

If either calibration counter 48 and misalignment counter 36 overflows while counting the pulses they receive, an error signal 61 is generated by overflow detection circuit 62. The error signal, is provided to the microprocessor 56 which disregards the data it receives for that particular load The overflow detection circuit is important to insure that false misalignment signals do not occur when the conveyor is stopped and/or one of the alignment scanners fails to detect its associated lug.

During operation of the alignment measuring device, it is important to keep track of which load stations are out of alignment. Therefore, the speed timer circuit 40 includes a bidirectional counter. The microprocessor 56 is programed to have a counter for receiving the outputs of the bidirectional counter and each load station 2 is assigned a number and a corresponding memory address. When a misalignment signal 50 is received from the magnitude comparator, the number stored in the memory address associated with the load station 2 that is misaligned is incremented. The alignment measuring device is arranged so that a misalignment signal will not be transmitted beyond the microprocessor before a few fault signals have been received from magnitude comparator 25 for a particular load station. This feature virtually eliminates the possibility of false readings.

The bidirectional counter detects the passage of each load station by monitoring the output of the tone detector 18 associated with scanner 10. It also monitors the motors (not shown) that drive the conveyor to determine whether the conveyor is being rotated in the forward or backward direction. Each time a lug passes the scanners, the microprocessor's counter is either incremented or decremented to insure that the alignment data accumulated is properly correlated to the appropriate load station. When a lug passes in the forward direction the bidirectional counter transmits a count up signal 101, while when lugs pass in the reverse direction a count down signal 102 is sent to the microprocessor counter.

When the alignment measuring device is being used to measure the alignment of the leading edges of lugs as described above, the outputs of the magnitude comparator 25 will be disregarded each time a count down signal is received since the system would be detecting the alignment of the back edges of the lugs 10–13. It should be appreciated, however, that if the requirements of a particular system required, the alignment timer circuitry 30 could also be arranged to monitor the trailing edges of the outputs of tone detector circuitry 18 so that the system can operate to check alignment while the conveyor is being rotated in the reverse direction as well.

Although the system described above was described primarily as a yes/no system wherein the magnitude comparator strictly indicates whether the passing load station is within the design tolerances, it will be appreciated that the information inputted into the magnitude comparator 25 is sufficient to determine the actual misalignment of each passing load station. It should be appreciated that in many instances it will be desirable to tabulate this information to provide quality control records that indicate how the tolerances of the various load stations vary over time. This information is valuable for a wide variety of applications such as studying wear trends. Understanding the wear trends of the load stations will allow the operator to predict when misalignment will begin to surface before the load stations are actually out of alignment so that they may be realigned prior to producing defective parts.

To insure that the counter does not slip a count, one of the load stations is designated the reference load station and each time it passes the scanners, the microprocessor counters to reset to zero. A wide variety of systems could be used for detecting the passage of the reference load station. In the embodiment illustrated in FIG. 3, a magnet 115 is carried by one of the lugs on the reference load station and a hall effect sensor 105 disposed adjacent the speed scanner 15 detects the passage of the magnet. The hall effect sensor sends a reset signal 107 to the counter each time the reference load station passes by.

It should also be appreciated that time delay signal 42 and speed timing signal 43 are indicative of the speed at which the conveyor is traveling. Thus, speed timing signal 43 may be feed into a speed counter 108 which measures the absolute speed of the conveyor for whatever purposes that information may be desired. The speed counter converts the speed timing pulse into a BCD number indicative of the number of pulses within speed timing signal 43, and outputs the BCD coded number to supervisory circuits 54 (microprocessor 56).

Figure 4:
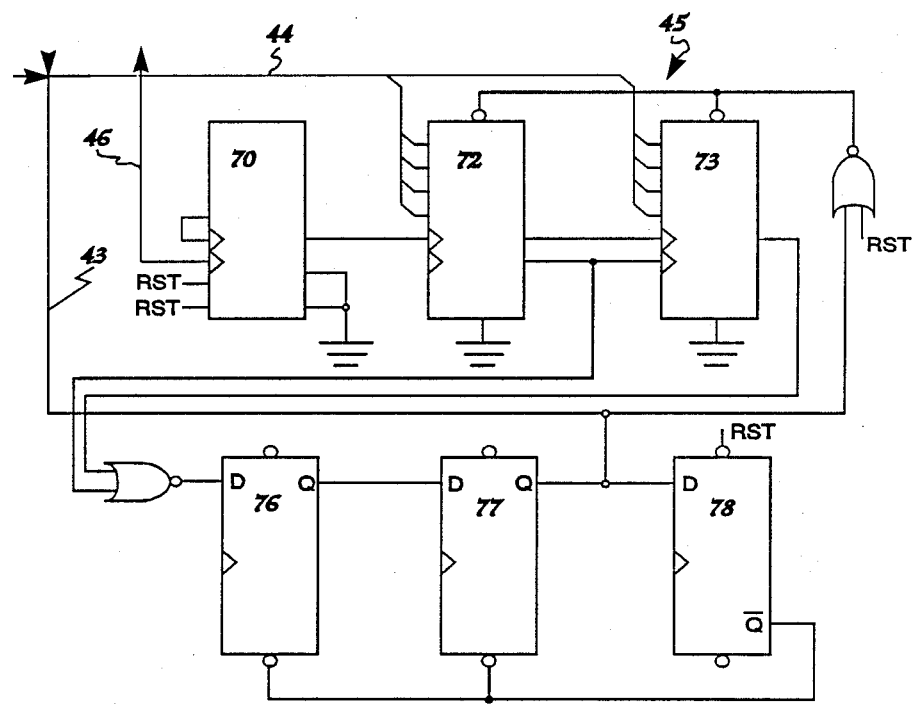
FIG. 4 is a schematic diagram of the frequency divider circuitry shown in FIG. 2.

Referring next to FIG. 4, the detailed circuitry of a suitable frequency divider 45 will be described. The frequency divider includes a tens counter 70, and a pair of programmable countdown registers 72,73 that are arranged in series with the tens counter 70. The speed timing signal 43 is fed directly into tens counter 70 which outputs a single pulse for each 10 pulses it receives. The programmable countdown registers function in the same manner, however, the values which they decrement from are programmable. The initial tolerance values for the programmable countdown registers 72,73 may be supplied by either microswitches set by the operator or through a computer input port coupled to microprocessor 56. The tolerance values inputted to the programmable counters are selected to insure that the alignment measuring system will accurately determine whether each passing load station falls within the selected tolerances. In the example given above, wherein the frequency divider is programed to divide by 500, the programmable countdown registers 72 and 73 combine to divide by 50. Thus, each time the registers are reset, countdown register 72 (the least significant bit) could be loaded with the value 10, while the most significant bit, register 73 would be loaded with the value 5. By way of example, suitable programmable countdown registers are 74LS192's available from Texas Instruments of Dallas Tex.

A plurality of flip flops 76–78 are arranged as shown in FIG. 4 to generate a single pulse each time both programmable count countdown registers have counted down to zero. The pulses emitted by the arrangement of flip flops form part of the scaled calibration signal 46. The emission of a calibration signal pulse also triggers the reloading of programmable countdown registers 72 and 73 with the chosen tolerance values as discussed above. It will be appreciated that the programmable countdown registers would also be reloaded with the selected tolerance values anytime the alignment measuring system is reset for any reason.

Figure 5:
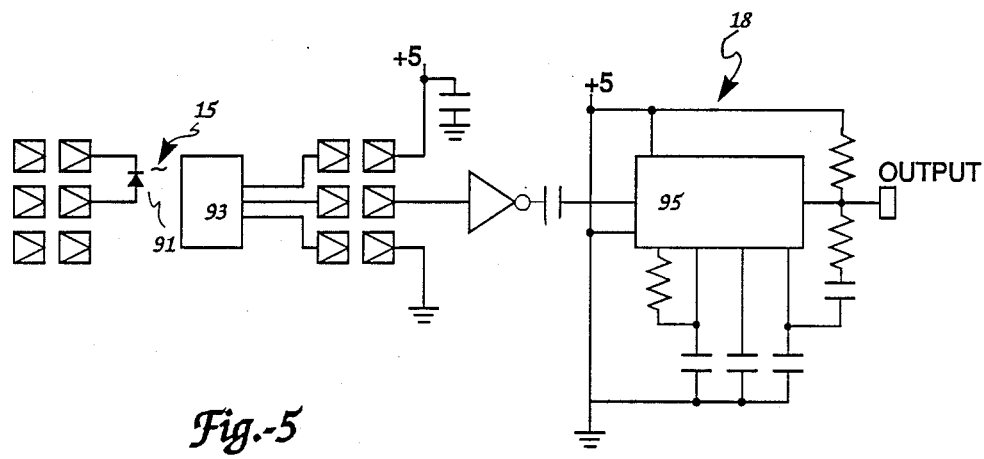
FIG. 5 is a schematic diagram of the detector circuitry shown in FIG. 2.

Referring next to FIG. 5, the construction of the scanner detector circuits will be described. The scanner detector circuits 18 provide the inputs to alignment timer circuit 30 and speed timer circuit 40. The scanners are LED scanners that take the form of transmitter/receiver pairs. The transmitters 91 are preferably narrow emissions bandwidth LED's having a high power output signal. As discussed above, the LED scanners 10–13,15 are pulsed at a high frequency which may be the frequency of oscillator clock 28. By way of example, a suitable clock/pulsing frequency is 100 KHz. The pulsing has two primary benefits. Initially, it allows the use of a higher intensity LED since the pulsed signal will operate at a cooler temperature than a constant beam. High intensity beams are desirable so that the light beam will transmit through surface irregularities on the lug surface and dust or resins on the transmitter or receiver. Second, the use of a source that is pulsed at a frequency outside the range of frequencies commonly found as background radiation within industrial environments minimizes the likelihood that extraneous noise will interfere with the operation of the scanner. By way of example a suitable LED transmitter is the Gilway E10 infrared LED manufactured by Gilway Technical Lab of Woburn, Mass, which has a 2 degree beam. A suitable operating current is 1 amp. A detector 93 that is sensitive to the emissions bandwidth of the LED transmitter 91 is positioned opposite the LED in spaced apart relation so that the lugs pass between the emitter and the receiver. By way of example, a suitable detector 93 is the SD5600 manufactured by Honeywell Opto Electronics of Richardson, Tex.

The output of detector 93 is monitored by a tone decoder 95. The tone decoder 95 may take the form of a LM5627 tone decoder manufactured by National Semiconductor of Santa Clara, Calif., that is configured as shown in FIG. 5. With such a configuration, the tone decoder outputs a high signal anytime the detector is not receiving a pulsed input at the selected frequency (100 KHz in the example above). The output of the tone decoders 95 associated with alignment scanners 10–13 are the outputs of the detector circuitry 18 of their associated scanners and thus form the inputs to alignment timer circuit 30. Similarly, the outputs of the tone decoders 95 associated with alignment scanner 10 and speed scanner 15 form the inputs to speed timer circuit 40.

The basic system described above functions as the heart of the alignment measuring system. However, to integrate the alignment measuring system into a production environment a wide variety of additional supervisory circuits and data handling routines may be provided. For example, it may be desirable to activate an alarm signal when misaligned load stations are detected. For example, the identity of each of the load stations having fault counts can be continuously displayed together with an indication of how many fault counts have been detected.

Additionally, the alignment measuring system can communicate with the feeding mechanism for the conveyor 4 to instruct the feeding mechanism not to load stock onto the conveyor 4. It may also be desirable to print out data indicating which load stations are out of alignment and which load stations should be realigned even though they may still be within the designated tolerances.

All of the parameter of the alignment measuring system can be outputted to an external host computer that is programmed to accomplish a wide variety data handling tasks. For example, in the finger-joint application described in the background section, the absolute speed data may be used to calculate the total board-feet produced during a particular production run or alternatively, the total number of finger joints completed in the production run.

Although only a few embodiments of the present invention have been described herein, it should be understood that the present invention may be embodied in many other specific forms without departing from the spirit or scope of the invention. Particularly, it should be appreciated that the particular layout of the circuits components described may be varied widely. Further, the circuitry has been described to trigger off of the detection of the leading edge of the lugs. It should be appreciated that any detectable alignment mark could be used without departing from the spirit of this invention. For example alignment holes could be provided in continuous pieces or the system could trigger off of the trailing edges.

Additionally, the supervisory circuits may be hard-wired logic circuits combined with non-volatile memory in place of the microprocessor based system described, which utilizes appropriate software to emulate the functions performed by the hard-wired logic. Therefore, the present examples and embodiments are to be considered as illustrative and not restrictive, and the invention is not to be limited to the details given herein, but may be modified within the scope of the appended claims.

I claim:

1. An apparatus for measuring the alignment of two or more adjacent targets having alignment reference indicia while the targets are in motion, the alignment measuring apparatus comprising:
   a first alignment scanner for detecting a first target;
   a second alignment scanner for detecting a second target;
   a speed scanner spaced apart from the first scanner for detecting said first target;
   an oscillatory timing clock for running at a selected frequency, the clock generating a continuous train of clock pulses;
   first timing means for measuring a first time differential indicative of the time delay between detection of the first and second targets by said alignment scanners to provide a measurement proportional to the misalignment between said first and second targets, the first timing means including a first counting means for determining the number of clock pulses that occur during said first time differential measurement; and
   second timing means for measuring a second time differential indicative of the time delay between detection of the first target by said first alignment scanner and said speed scanner to provide a measurement that is proportional to the speed at which the targets are traveling and determining whether adjacent targets are within alignment tolerances based in part upon the time differential measurements detected by said first and second timing means.

2. An alignment measuring apparatus as recited in claim 1 wherein said second timing means includes a second counting means for determining the number of clock pulses that occur during said second time differential measurement.

3. An alignment measuring apparatus as recited in claim 2 and further comprising a frequency divider for proportionally dividing the number of clock pulses in said second time differential measurement by a selectable number to provide an calibration output indicative of the maximum number of clock pulses that may occur within said first time differential measurement for the targets to remain within a selected tolerance.

4. An alignment measuring apparatus as recited in claim 3 further comprising a magnitude comparator for comparing the magnitude of the calibration output to the number of pulses within said first time differential measurement to determine whether the targets are within the selected tolerance.

5. An alignment measuring apparatus as recited in claim 4 further comprising a multiplicity of alignment scanners, each alignment scanner for detecting an associated target.

6. An alignment measuring apparatus as recited in claim 5 wherein said alignment scanners are positioned such that if said targets are perfectly aligned, the first time differential measurement is substantially zero.

7. An alignment measuring apparatus as recited in claim 5 wherein said first time differential measurement is indicative of the time delay between a leading target and a trailing target.

8. An alignment measuring apparatus as recited in claim 4 further comprising an endless conveyor having a multiplicity of load stations at spaced apart intervals about the conveyor, each said load station having at least two lugs that constitute said targets.

9. An alignment measuring apparatus as recited in claim 8 wherein said endless conveyor forms a conveyor for a finger joint machine.

10. An alignment measuring apparatus as recited in claim 9 further comprising means for identifying the particular load stations that are misaligned.

11. An alignment measuring system as recited in claim 3 wherein said frequency divider includes:
    a plurality of serially connected countdown registers that each output a single pulse after the reception of a designated number of pulses, at least one of said countdown registers being programmable; and
    means for inputting a selectable value into said programmable countdown register to vary the proportional pulse count of the output signal inversely with the inputted value.

12. An alignment measuring apparatus for use in conjunction with an endless conveyor supported by a frame and having a multiplicity of load stations at spaced apart intervals about the conveyor, each of the load stations having at least two lugs, the alignment measuring apparatus checking the alignment of the lugs while the conveyor remains in continuous motion and comprising:
    a first alignment scanner for detecting the passage of a first lug from a particular load station, the first alignment scanner being fixedly mounted to the frame;
    a second alignment scanner for detecting the passage of a second lug from the particular load station, the second alignment scanner being fixedly mounted to the frame;
    a speed scanner spaced apart from the first scanner a fixed distance, the speed scanner also detecting the passage of said first lug;
    an oscillatory timing clock for running at a selected frequency, the clock generating a train of clock pulses;
    first timing means for measuring a first time differential indicative of the time delay between detection of the first and second lugs by said alignment scanners to provide a measurement proportional to the misalignment between said first and second lugs, the first timing means including first counting means for determining the number of clock pulses that occur during said first time differential measurement;

second timing means for measuring a second time differential indicative of the time delay between detection of the first lug by said first alignment scanner and said speed scanner to provide a measurement that is proportional to the speed at which the lugs are traveling, the second timing means including second counting means for determining the number of clock pulses that occur during said second time differential measurement;

a frequency divider for proportionally dividing the number of clock pulses in said second time differential measurement by a selectable number to provide an calibration output indicative of the maximum number of clock pulses that may occur within said first time differential measurement for the lugs to remain within a selected tolerance; and a magnitude comparator for comparing the magnitude of the calibration output to the number of pulses within said first time differential measurement to determine whether the lugs are within the selected tolerance.

13. An alignment measuring apparatus as recited in claim 12 wherein each load station includes a multiplicity of at least three lugs, the alignment measuring apparatus further comprising a multiplicity of alignment scanners, each said alignment scanner for detecting an associated lug, wherein the alignment scanners are positioned such that if the lugs are perfectly aligned, the first time differential measurement is substantially zero and wherein the first time differential measurement is indicative of the time delay between the leading lug and the trailing lug.

14. An alignment measuring system as recited in claim 12 wherein said frequency divider includes:
a plurality of serially connected countdown registers that each output a single pulse after the reception of a designated number of pulses, at least one of the countdown registers being programmable; and
means for inputting a selectable value into said programmable countdown register to vary the proportional pulse count of the output signal inversely with the inputted value.

15. An alignment measuring system as recited in claim 12 further comprising means for identifying the particular load station that is out of alignment.

* * * * *